US012290818B2

(12) United States Patent
Yang

(10) Patent No.: US 12,290,818 B2
(45) Date of Patent: May 6, 2025

(54) CERAMIC CUTTING TEETH-DOVETAILED CUTTING DEVICE OF CUTTING-TYPE RICE MILLING MACHINE

(71) Applicant: SENONGTECH LTD., Cheongju-si (KR)

(72) Inventor: Jae Seung Yang, Cheonan-si (KR)

(73) Assignee: SENONGTECH LTD., Cheongju-si (KR)

( * ) Notice: Subject to any disclaimer, the term of this patent is extended or adjusted under 35 U.S.C. 154(b) by 800 days.

(21) Appl. No.: 17/623,198

(22) PCT Filed: Mar. 23, 2021

(86) PCT No.: PCT/KR2021/003600

§ 371 (c)(1),
(2) Date: Dec. 27, 2021

(87) PCT Pub. No.: WO2021/225274

PCT Pub. Date: Nov. 11, 2021

(65) Prior Publication Data

US 2022/0355306 A1 Nov. 10, 2022

(30) Foreign Application Priority Data

May 4, 2020 (KR) ........................ 10-2020-0053406
May 18, 2020 (KR) ........................ 10-2020-0059022

(51) Int. Cl.
*B02B 3/04* (2006.01)
*B02B 3/06* (2006.01)

(52) U.S. Cl.
CPC . *B02B 3/04* (2013.01); *B02B 3/06* (2013.01)

(58) Field of Classification Search
CPC ................ B02B 3/04; B02B 3/06; B02B 3/08
See application file for complete search history.

(56) References Cited

U.S. PATENT DOCUMENTS 5,152,640 A 10/1992 Regis et al.

FOREIGN PATENT DOCUMENTS

| | | | |
|---|---|---|---|
| CN | 106457253 | A | 2/2017 |
| CN | 205925820 | U | 2/2017 |
| JP | S631454 | A | 1/1988 |
| JP | 2016508445 | A | 3/2016 |
| JP | 2017515665 | A | 6/2017 |
| KR | 200179094 | Y1 | 4/2000 |
| KR | 100664675 | B1 | 1/2007 |
| KR | 101475281 | B1 | 12/2014 |
| KR | 1020150142430 | A | 12/2015 |
| KR | 101596908 | B1 | 2/2016 |
| KR | 102155251 | B1 | 9/2020 |

*Primary Examiner* — Brian W Jennison
(74) *Attorney, Agent, or Firm* — Rabin & Berdo, P.C.

(57) ABSTRACT

The present invention relates to a ceramic cutting teeth-dovetailed cutting device of a cutting-type rice milling machine. In general, a cutting tool is used to cut outer bran of brown rice in a cutting-type rice milling machine. Here, the cutting tool is configured of a combined body in which cutting rings and spacer rings are alternately combined, and the cutting rings have a ring shape with a uniform thickness and have an outer circumference on which gear-shaped trapezoidal cutting teeth are formed to cut outer bran of brown rice by edge portions of the cutting teeth such that white rice is produced. More specifically, the invention relates to a cutting device used in a rice milling machine, the cutting device having a configuration in which a main cutting-device body is dovetailed with cutting teeth.

14 Claims, 9 Drawing Sheets

CERAMIC CUTTING TEETH-DOVETAILED CUTTING DEVICE OF CUTTING-TYPE RICE MILLING MACHINE

TECHNICAL FIELD

The present invention relates to a ceramic cutting teeth-dovetailed cutting device of a cutting-type rice milling machine.

In general, a cutting tool is used to cut outer bran of brown rice in a cutting-type rice milling machine. Here, the cutting tool is configured of a combined body in which cutting rings and spacer rings are alternately combined, and the cutting rings have a ring shape with a uniform thickness and have an outer circumference on which gear-shaped trapezoidal cutting teeth are formed to cut outer bran of brown rice by edge portions of the cutting teeth such that white rice is produced.

More specifically, the invention relates to a cutting device (100) used in a rice milling machine, the cutting device having a configuration in which a main cutting-device body (11) is dovetailed with cutting teeth (15).

BACKGROUND ART

Patent Literature 1 is described in Korean Patent Registration No. 10-1596908 (published on Feb. 23, 2016) and the concept of the conventional cutting-type rice milling machine is described with reference to FIG. 1A.

A driving shaft (200) is rotatably installed in a rice cleaning machine case (230), a cutting ring assembly (100) for cutting brown rice is formed on the driving shaft (200), and a screen is fitted and spaced apart from the cutting ring assembly (100).

In addition, a screw (210) for conveying the brown rice adjacent to one side of the cutting ring assembly (100) is mounted on the drive shaft (200) and the cutting ring assembly is alternately coupled with a cutting ring and a spacing ring outside a support shaft.

In addition, a hopper for supplying the brown rice is installed on the upper portion of the screw (210).

The drive shaft (200) is rotatably supported by bearings (240) and receives a power by a pulley, which is connected to a motor. An outlet (260) for discharging the rice grains is formed at the case (230) near the end of the cutting ring assembly (100).

The cutting ring will be described with reference to FIG. 1B.

The cutting ring (120), which is assembled to the cutting ring assembly (100) is a ring shape having a constant thickness. A support shaft fitting hole (121) is formed through the center thereof. A cutting passage (122) is a channel shape in which the front and rear surfaces of the cutting ring (120) are connected to each other. The channel includes a bottom surface (122*a*) and a pair of side surfaces (122*b*) extending on both sides of the bottom surface (122*a*). A plurality of cutting passages (122) are formed at equal intervals on the outer circumferential surface of the cutting ring (120). When the rice grains pass through the cutting passages (122), the rice bran is cut by contacting it with the edge of the bottom surface (122*a*) of the channel and the edge of the side surface (122*b*) of the channel.

Patent Literature 2 is described in Korean Utility Model Registration No. 20-0179094 (published on Apr. 15, 2000) and the concept of the conventional cutting-type rice milling machine is described with reference to FIG. 2.

In the rice cleaning machine of FIG. 2, rice grains before rice are firstly putted into a supplying unit. The rice grains, which are fed into the supply unit, are supplied to a spiral feed screw (116) through the rotation of a main shaft and then, are forced to be transferred to the rice cleaning room where the body (120) is disposed. The rice grain transferred to the body (120) first passes through the grinding unit (122).

At this time, the grinding unit (122) primarily removes the skin of the rice husk and brown rice of surrounding the rice grain. The grinding unit (122) is fusion-coated with ceramic powders to have a constant surface roughness. The rice grains primarily milled in the grinding unit (122) pass through the friction unit (124) again and the milling is completed.

On the other hand, in the conventional cutting-type rice milling machine, if the hardness of the cutting teeth is high, since the surface of the rice grain, which is cut, is clean and the cutting resistance is low, there are many advantages such as less energy consumption and so on. However, since the brittleness of the cutting tool is high, there are disadvantages in that it is easy to break and the price thereof is high.

In Patent Literature 1, a cutting blade and a cutting ring body, which are composed of a heat-treated steel material, are integrally formed. In comparison with cutting machine made of cemented carbide or ceramic materials, it is resistant to breakage. However, when it is used for about a year, the blade of the cutting edge becomes dull and cannot be used.

On the other hand, in the Patent Literature 2, a technique having a constant surface roughness by fusion-coating the ceramic powders on the grinding unit (122) for milling the rice grains is introduced. However, in the coated cutting tool, since the coating material thereof is easily peeled off, it is not suitable for rice milling.

DISCLOSURE

Technical Problem

A rice grain has a rice germ by which the rice grain is divided into an outer portion and an inner portion. The outer portion is hard and is likely to be brittle, and the inner portion is relatively soft and easily cut. When a cutting blade has a low hardness, a polished rice grain has a rough surface viewed as a poor external appearance and is difficult to store for a long time, and particularly, an inner portion of the polished rice grain is cut too much together with bran. Thus, production of white rice not only decreases, but also a loss of rice germ increases. In addition, the low hardness of a cutting blade hardness results in an increase in cutting resistance, and thus a problem arises in that a rice milling machine is overheated to consume higher cutting energy. Consequently, a cutting tooth of a cutting-type rice milling machine is good to have a high hardness; however, when a cutting tool has a hardness too high, it is weak in an impact or the like due to increased brittleness, and manufacturing costs thereof is more increased.

In this respect, in order to increase the hardness of the cutting tooth of the rice milling machine, heat treated steel is used; however, there is a limitation on improvement of the hardness of the cutting tooth because a problem arises in that, when the hardness is increased too high, the cutting blade has an increase in brittleness and is broken and a service life thereof is shortened.

In addition, in order to solve such problems, there have been attempts to coat a surface of a cutting tooth with synthetic diamond powder or a ceramic material so as to increase the hardness of the cutting tooth; however, while a coated cutting tool has good cutting performance at an early period after coating is performed, the coating is lost not long after the coated cutting tooth is used, and thus a problem arises in that the cutting tool does not function properly.

In this respect, the invention is made to solve such problems by providing a cutting ring configured to have a main body which is dovetailed with a sintered hard metal alloy or a sintered ceramic material. In other words, when cutting teeth are dovetailed with the cutting ring, more advantages can be achieved in that the cutting teeth have a high hardness such that a milled rice grain has a smooth surface, energy consumption is reduced, and a service life of a cutting tool increases. Here, a main cutting-device body is made of general steel, thus, sufficiently absorbing cutting resistance or impact generated during cutting.

Technical Solution

According to an aspect of the invention to achieve the object described above, there is provided a cutting device (100) for rice milling of the present invention configured to include a main cutting-device body (11) and cutting teeth (15), the main cutting-device body being dovetailed with the cutting teeth (15), the cutting teeth being dovetailed with the main body (11) at equal intervals along an outer circumferential surface of the main body (11).

The entire main cutting-device body (11) according to the first embodiment has a pipe shape and has a shape formed by fitting the cutting teeth (15) made of a sintered material at equal intervals along an outer circumference of the main cutting-device body (11).

The main cutting-device body (11) has a through-hole at a central portion thereof and has multiple fitting grooves (12) at the outer circumference in a length direction of the pipe shape. An external surface of the main cutting-device body (11) becomes a cutting passage (13), and the fitting grooves (12) are formed between the cutting passage (13) and the cutting passage (13). The cutting teeth (15) and spacer members (15*b*) are alternately fitted into the fitting grooves (12).

The fitting groove (12) has fitting side-surfaces (12*b*) formed at both sides from a fitting bottom (12*a*) and has a structure in which a width between the fitting side-surfaces is narrowed from the fitting bottom (12*a*) toward the external surface of the main cutting-device body (11). The entire cutting tooth (15) and the entire spacer member (15*b*) which are dovetailed into the fitting grooves have a structure of having a trapezoidal shape which is narrowed in a direction from a is bottom (15*a*) of the cutting tooth (15) toward a cutting blade edge (18).

In other words, the cutting teeth (15) is dovetailed into the fitting grooves (12), so that it enables the cutting teeth (15) not to easily fall out even when the cutting device (100) rotates quickly.

On the other hand, the cutting teeth (15) are made of a hard metal alloy or a ceramic material for a tool. The main cutting-device body (11) does not determine cutting performance, and thus, does not need to maintain a high hardness. Therefore, the main cutting-device body can be made of general steel and also does not need to be subjected to additional heat treatment.

Advantageous Effects

The invention is configured to include the main steel body (11) of the cutting device and the ceramic material dovetailed with the main steel body. As known in the related art, the ceramic material has a very high hardness, and thus the cutting device has a long service life and can smoothly cut rice grains. Hence, rice milling efficiency becomes high, and more rice germ remains in rice such that a high rice milling quality can be achieved.

Besides, the ceramic cutting teeth have advantages of generating low cutting resistance during rice milling, generating less heat due to the rice milling, and being manufactured at relatively low costs.

BRIEF DESCRIPTION OF DRAWINGS

The above and other objects, features and advantages of the present is invention will be more apparent from the following detailed description taken in conjunction with the accompanying drawings, in which:

FIG. 1A shows an explanatory diagram of a polishing process of a conventional cutting-type rice milling machine;

FIG. 1B and FIG. 1C are front views showing an embodiment of a conventional cutting ring and cutting ring assembly;

FIG. 3A shows a cutting tool ring body according to a first embodiment of the present invention;

FIG. 3B is a perspective view showing a cutting tool assembly according to a first embodiment of the present invention;

FIG. 3C is a perspective view showing another cutting tool assembly according to the first embodiment of the present invention;

FIG. 4A shows a cutting tool body according to a second embodiment of the present invention; and FIG. 4B is a perspective view showing a space ring according to a second embodiment of the present invention.

REFERENCE SIGNS LIST

Figure 1A:
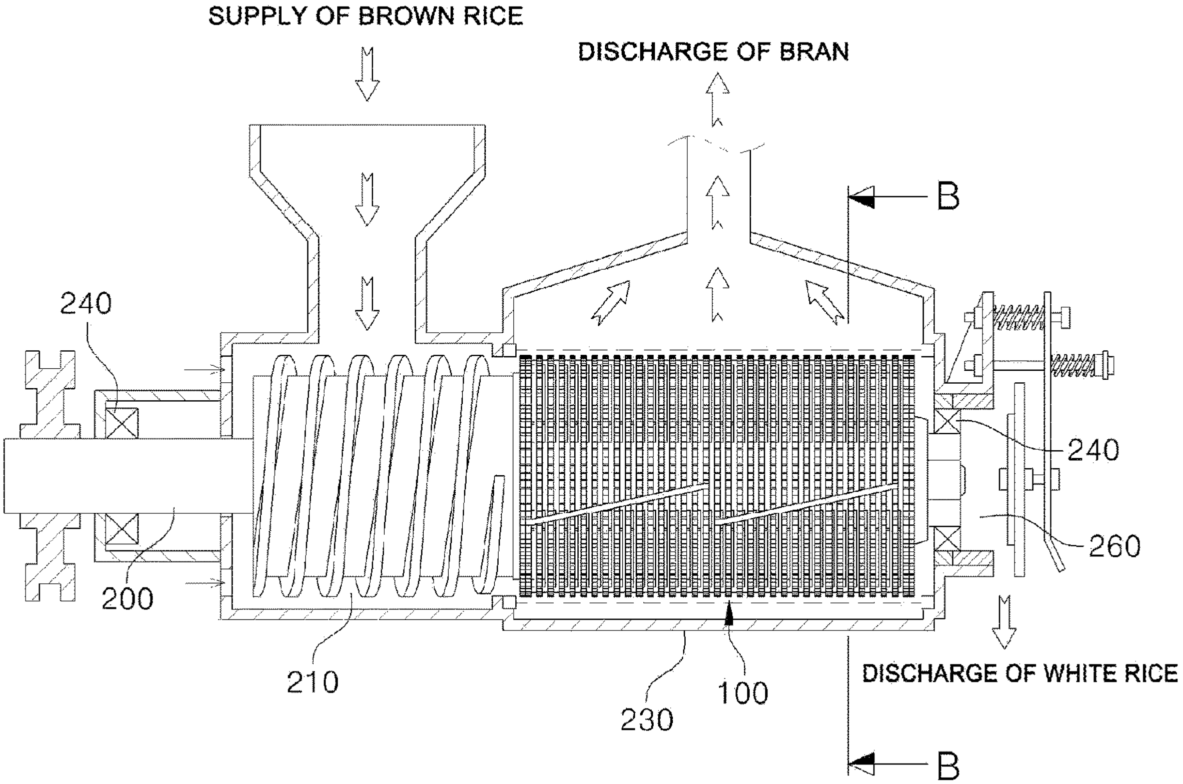
FIG. 1A, FIG. 1B and FIG. 1C, respectively, illustrate an explanatory diagram of a rice milling machine shown in Patent Literature 1.
Figure 1B:
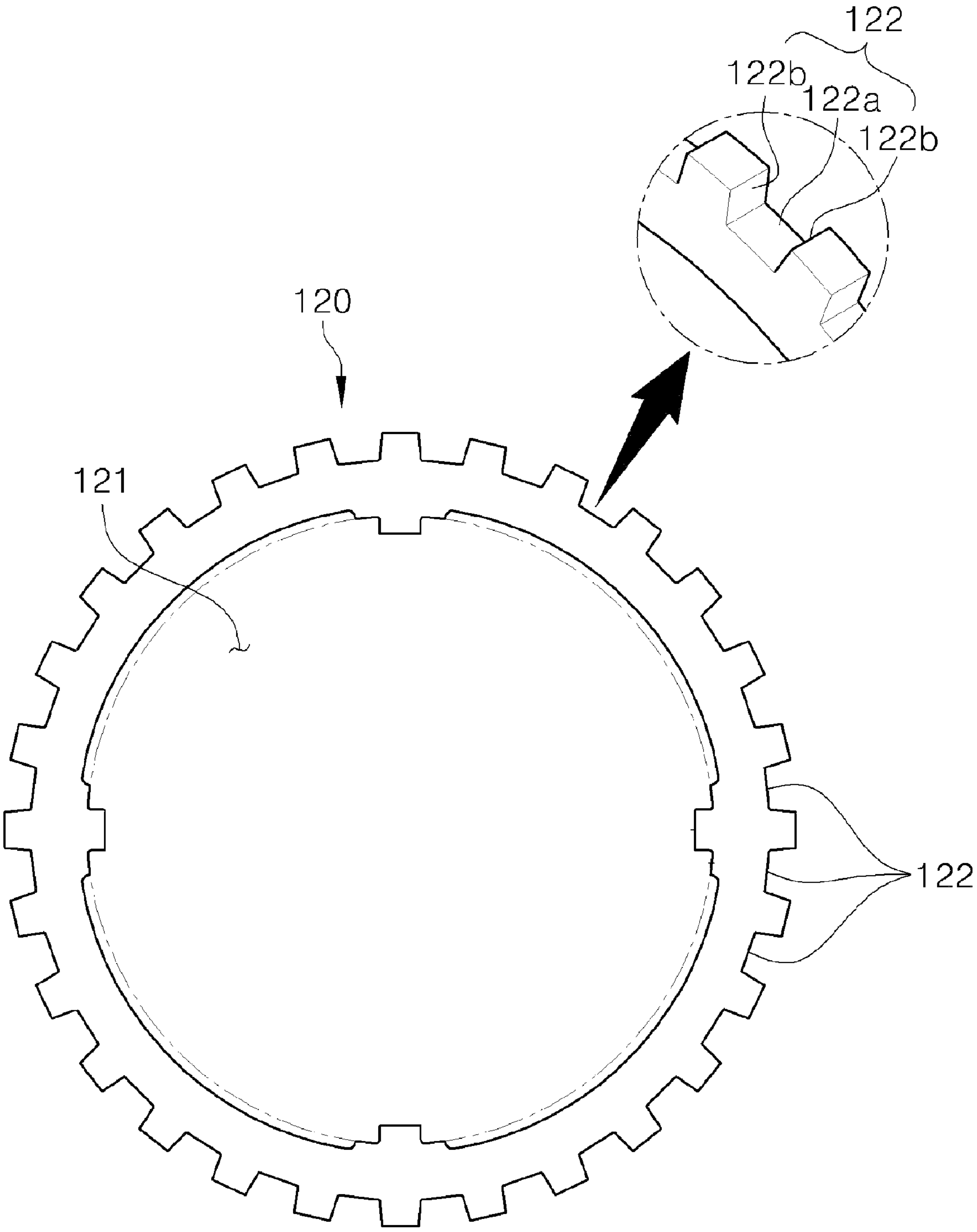
Figure 1C:
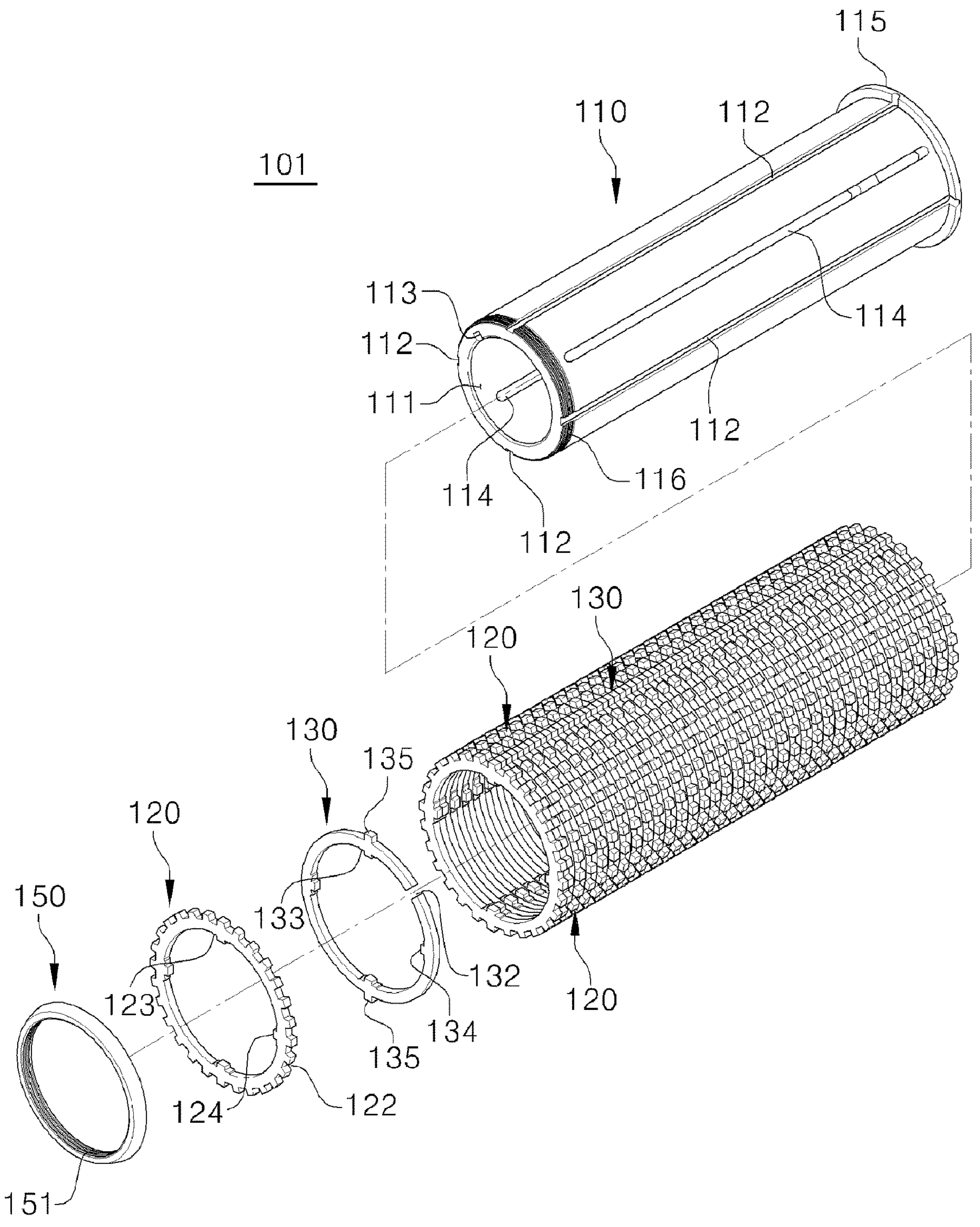
Figure 2:
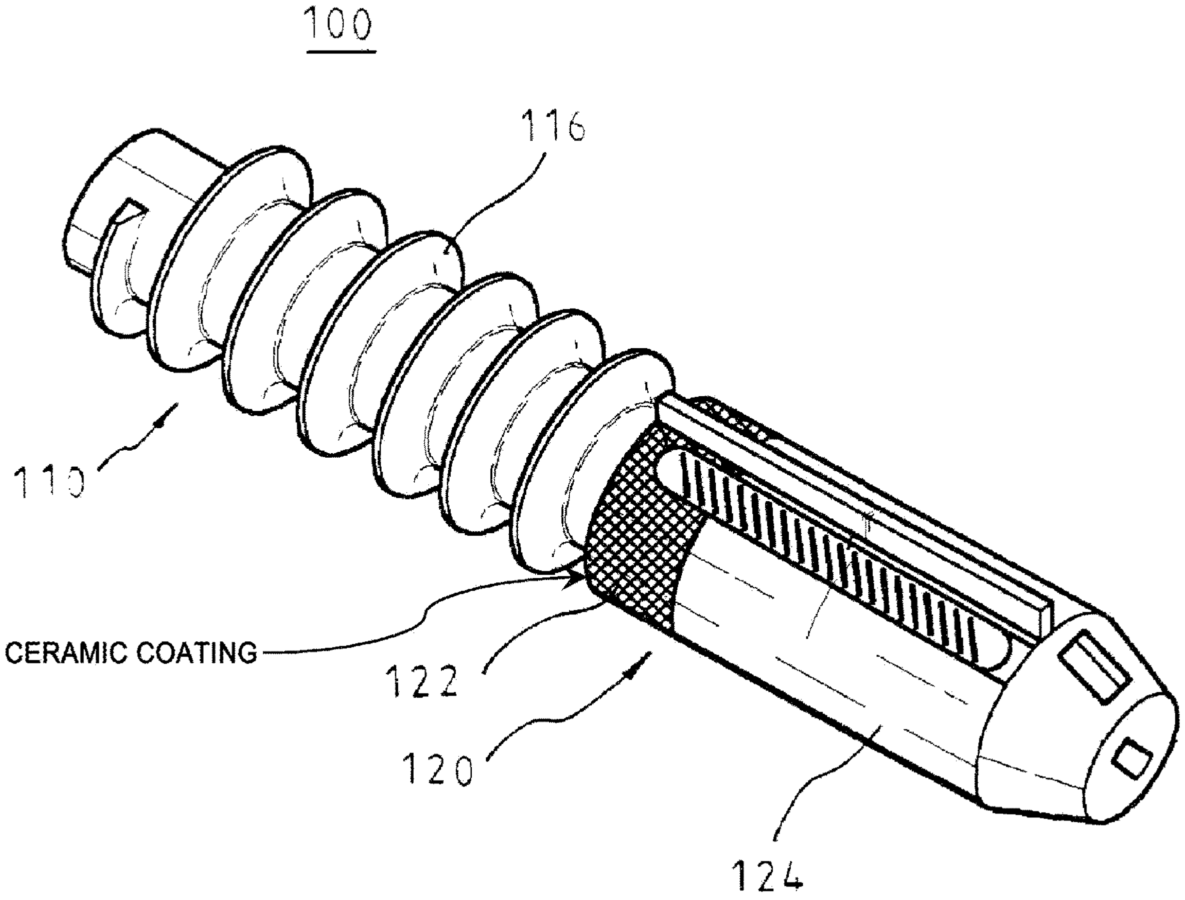
FIG. 2 illustrates a perspective view of the rotor shown in Patent Literature 2.

11: main cutting-device body
12: multiple fitting grooves
12*a*: fitting bottom
12*b*: fitting side-surfaces
13: cutting passage
14: through-holes
15: cutting teeth
15*a*: bottom of cutting teeth
15*b*: spacer member
18: cutting blade edge
20: space ring
21: cutout portion
100: cutting device

BEST MODE

Mode for Invention

Hereafter, the function, configuration, and operation of a ceramic cutting teeth-dovetailed cutting device of a cutting-type rice milling machine according to the present invention are described in detail with reference to the accompanying drawings.

Figure 3A:
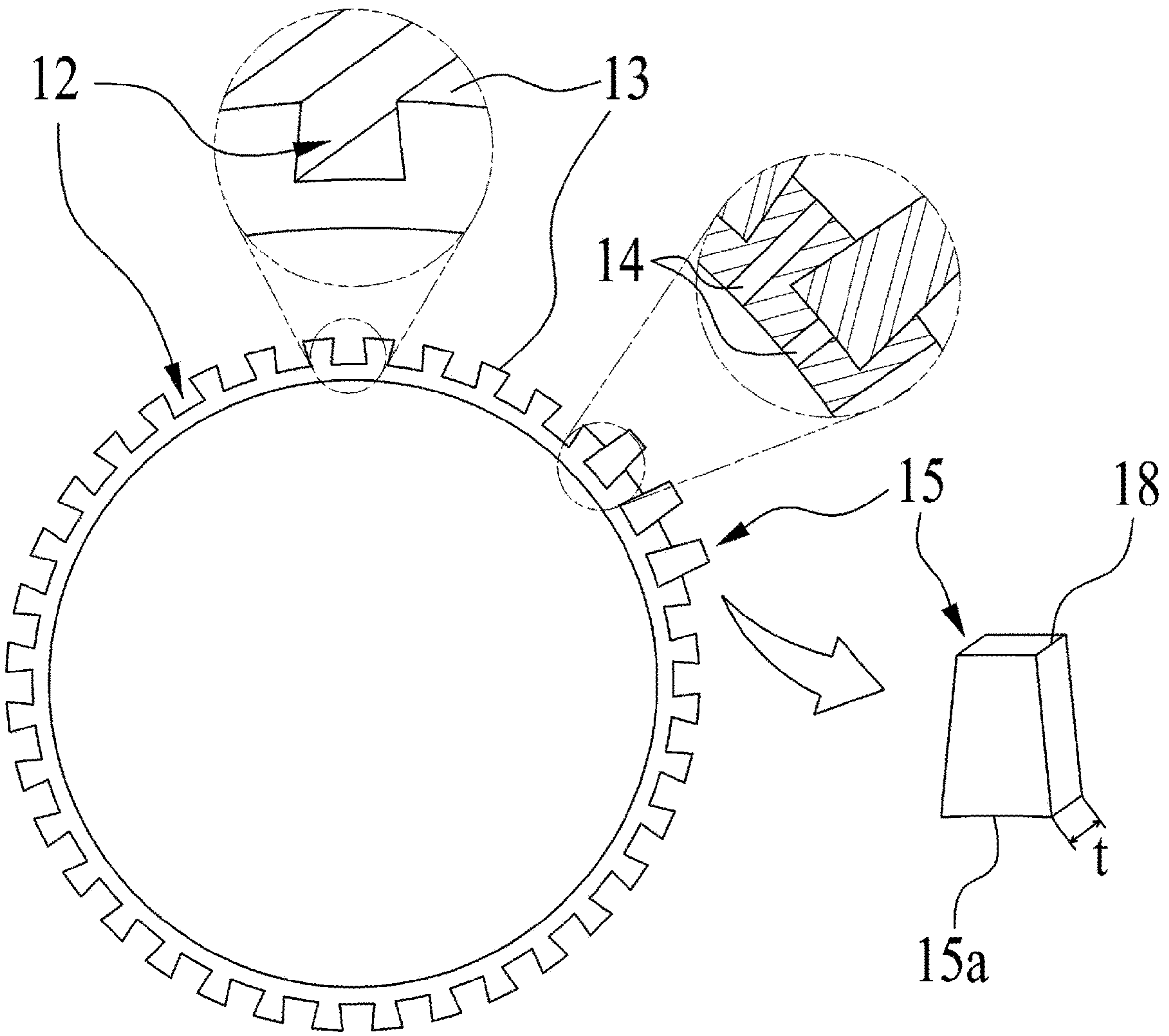
FIG. 3A, FIG. 3B and FIG. 3C, respectively, illustrate an explanatory diagram of a first embodiment of the present invention.
Figure 3B:
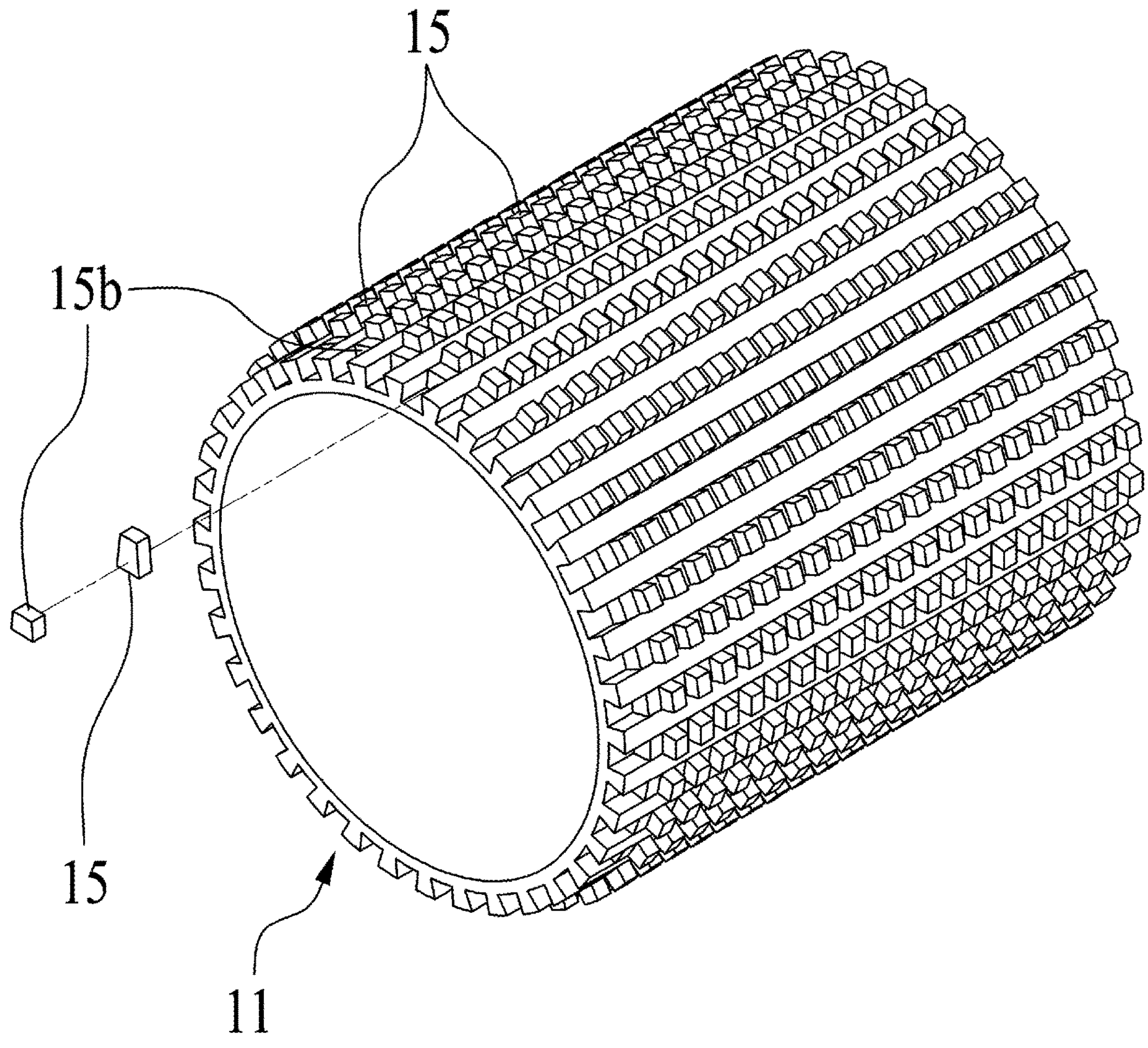
Figure 3C:
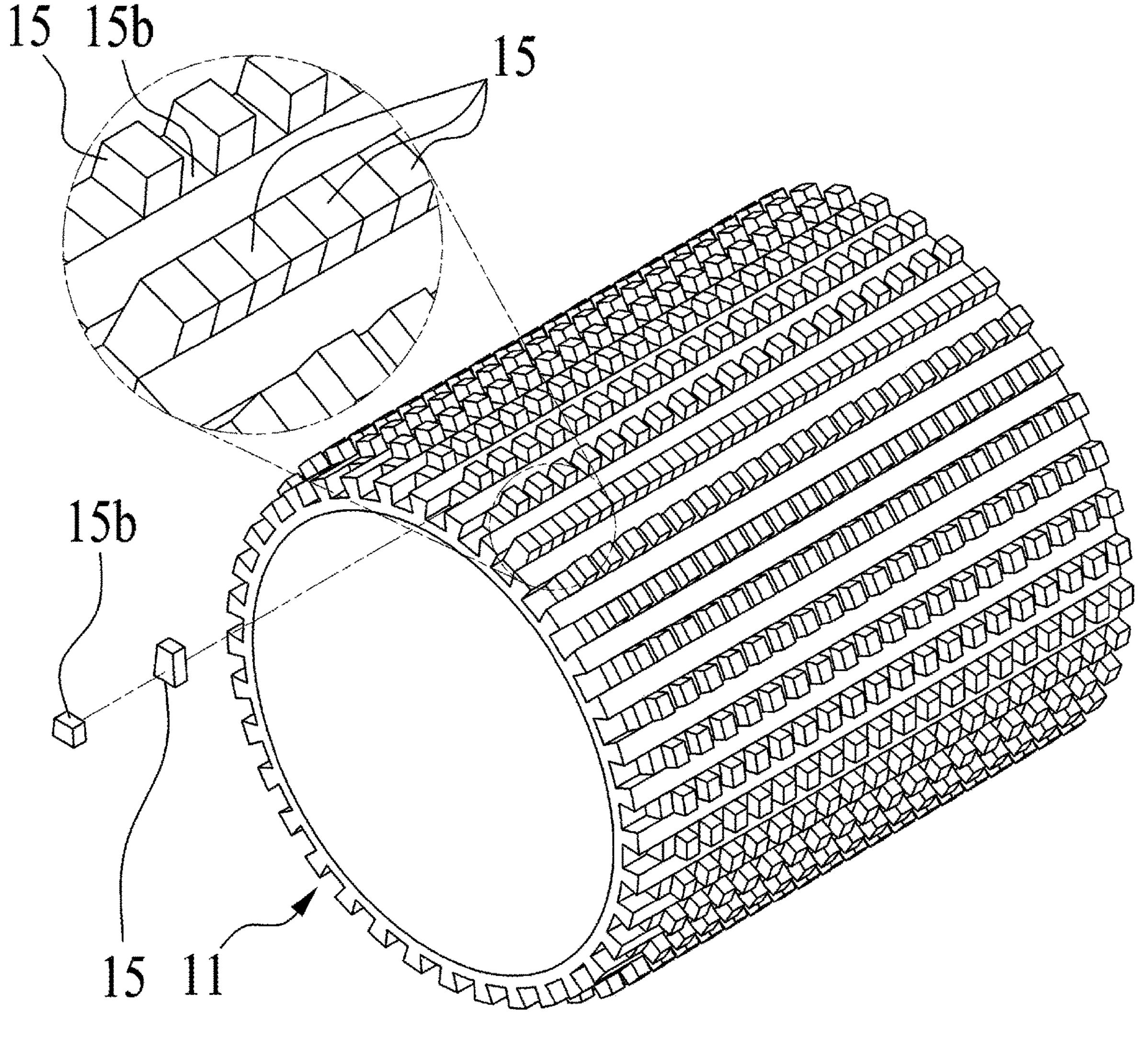

A cutting device (100) for rice milling of a first embodiment of the invention illustrated in FIG. 3A, FIG. 3B and FIG. 3C, is configured to include a main cutting-device body (11) and cutting teeth (15), the main cutting-device body is being dovetailed with the cutting teeth (15), the cutting teeth being dovetailed with the main body (11) at equal intervals along an outer circumferential surface of the main body (11).

The entire main cutting-device body (11) according to the first embodiment has a pipe shape and has a shape formed by fitting the cutting teeth (15) made of a sintered material at equal intervals along an outer circumference of the main cutting-device body (11).

The main cutting-device body (11) has a through-hole at a central portion thereof and has multiple fitting grooves (12) at the outer circumference in a length direction of the pipe shape.

An external surface of the main cutting-device body (11) becomes a cutting passage (13), and the fitting grooves (12) are formed between the cutting passage (13) and the cutting passage (13). The cutting teeth (15) and spacer members (15*b*), which will described below, are alternately fitted into the fitting grooves (12).

The fitting groove (12) has fitting side-surfaces (12*b*) formed at both sides from a fitting bottom (12*a*) and has a structure in which a width between the fitting side-surfaces is narrowed from the fitting bottom (12*a*) toward the external surface of the main cutting-device body (11).

The entire cutting tooth (15) and the entire spacer member (15*b*) which are dovetailed into the fitting grooves have a structure of having a trapezoidal shape which is narrowed in a direction from a bottom (15*a*) of the cutting tooth (15) toward a cutting blade edge (18).

In other words, when the cutting teeth (15) and the spacer members (15*b*), which will be described below, are dovetailed into the fitting grooves (12), selecting this structure enables the cutting teeth (15) and the spacer members (15*b*) not to easily fall out even when the cutting device (100) rotates quickly.

On the other hand, the main cutting-device body (11) does not determine cutting performance, and thus, does not need to maintain a high hardness.

Therefore, the main cutting-device body can be made of general steel and also does not need to be subjected to additional heat treatment.

Next, a structure of the cutting teeth (15) which are dovetailed into the fitting grooves (12) of the main cutting-device body (11) will be described.

The cutting teeth (15) having a uniform thickness (t) have a trapezoidal shape, the thickness is the same thickness (t) at an undersurface and a top surface thereof, and the cutting teeth are made of a hard metal alloy or a ceramic material fora tool.

The bottom (15*a*) of the cutting tooth is dovetailed into the fitting groove (12) of the main cutting-device body (11), and the entire cutting tooth has a structure of having a trapezoidal shape which is narrowed in a direction from the bottom (15*a*) of the cutting tooth toward the cutting blade edge (18).

In other words, when the main cutting-device body (11) is dovetailed with the cutting teeth (15) as described above, selecting the trapezoidal structure of the cutting teeth (15) enables the cutting teeth not to fall out even when the cutting device (100) rotates at a high speed.

On the other hand, the cutting blade edge (18) of the cutting tooth (15) desirably has an angle of larger than 90° and smaller than 104°. When the cutting blade edge has an angle of smaller than 90°, it is difficult to dovetail the cutting teeth (15) with the main cutting-device body (11). When the cutting blade edge (18) has an angle of larger than 104°, shortcomings are as follows. Cutting resistance increases to cause an increase in energy consumption, and a cut surface of a rice grain is rough. A desirable angle of the cutting blade edge is from 95° to (100)°, the cutting teeth (15) can be more strongly fitted into the fitting grooves (12) using an adhesive.

Next, a structure of the spacer member (15*b*) which is dovetailed between the cutting tooth (15) and the cutting tooth (15) will be described. The spacer member (15*b*) has a shape approximately similar to a shape of a lower half of the cutting tooth (15).

In other words, the spacer member has a trapezoidal shape having a uniform thickness (t), the thickness is the same thickness (t) at an undersurface and a top surface thereof, and a material thereof is the same material as the material (hard metal alloy or ceramic material) of the cutting tooth or as the material of the main cutting-device body (11).

On the other hand, the cutting passage (13) of the main cutting-device body can have small through-holes (14) formed in a direction toward an inner central portion of the main cutting-device body. The through-holes (14) are formed in plurality as air holes.

When the spacer members (15*b*) are made of the same material as that of the main cutting-device body (11), the spacer members (15*b*) have the through-holes (14), and the through-holes (14) can be formed at positions of the main cutting-device body (11) which correspond to the through-holes of the spacer members.

On the other hand, the cutting teeth (15) can be arranged in various forms depending on a method of fitting the cutting teeth (15) and the spacer members (15*b*) into the fitting grooves (12) of the main cutting-device body (11).

In other words, when 'a cutting tooth (15) and a spacer member (15*b*)' are fitted into the fitting grooves (12) of the main cutting-device body (11) respectively, the cutting teeth (15) are opposed to each other and the spacer members (15*b*) are fitted in a position opposite to each other. At this time, as shown in FIG. 3B according a first embodiment, lines of connecting the outer circumferences of the cutting teeth (15) and lines of connecting the outer circumferences of the spacer members (15*b*) are arranged to form a circular shape along the outer circumferential surface of the main cutting-device body (11), and in another embodiment, adjacent 'cutting teeth (15) and spacer members (15*b*)' can sequentially be out of line in disposed position from each other to be arranged in a helical shape.

In addition, as illustrated in FIG. 3C in the first embodiment, when only the cutting teeth (15) are fitted into the fitting grooves (12), but the spacer members are not fitted, or when a method of fitting a plurality of spacers members and then fitting one or a plurality of spacer members (15*b*) is performed, the spacer members can function as a guide member that guides movement of rice grains.

A second embodiment of the invention relates to a cutting device (100) configured to include a main cutting-device body (11) in which cutting rings (10) and spacer rings (20) are alternately combined with each other, the cutting rings (10) being dovetailed with cutting teeth (15) which are dovetailed with the main body (11).

In other words, the second embodiment provides a structure in which a cutting tooth portion of a cutting ring in Patent Literature 1 is separately made of a ceramic material and is combined.

Figure 4A:
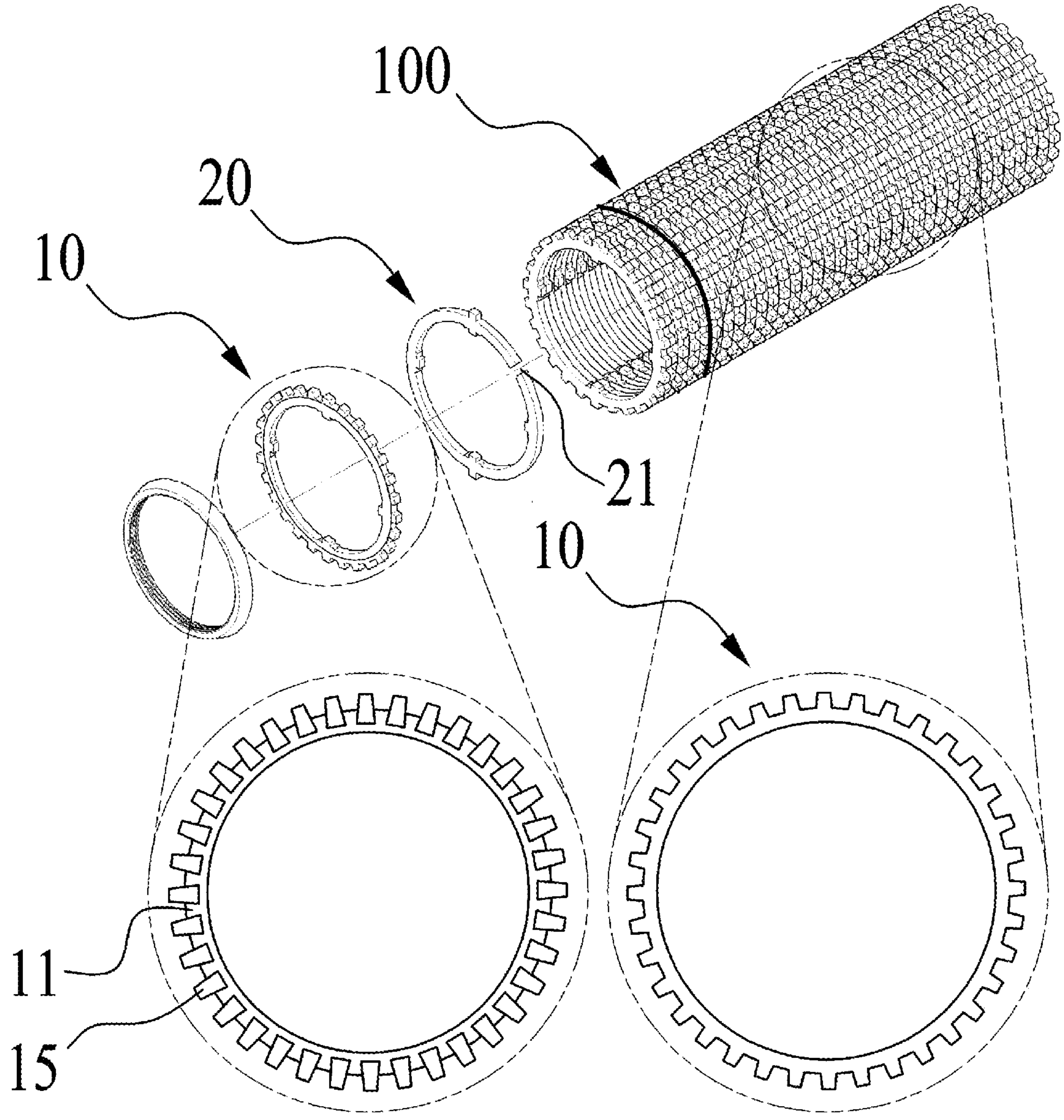
FIG. 4A and FIG. 4B, respectively, illustrate an explanatory diagram of a second embodiment of the present invention.
Figure 4B:
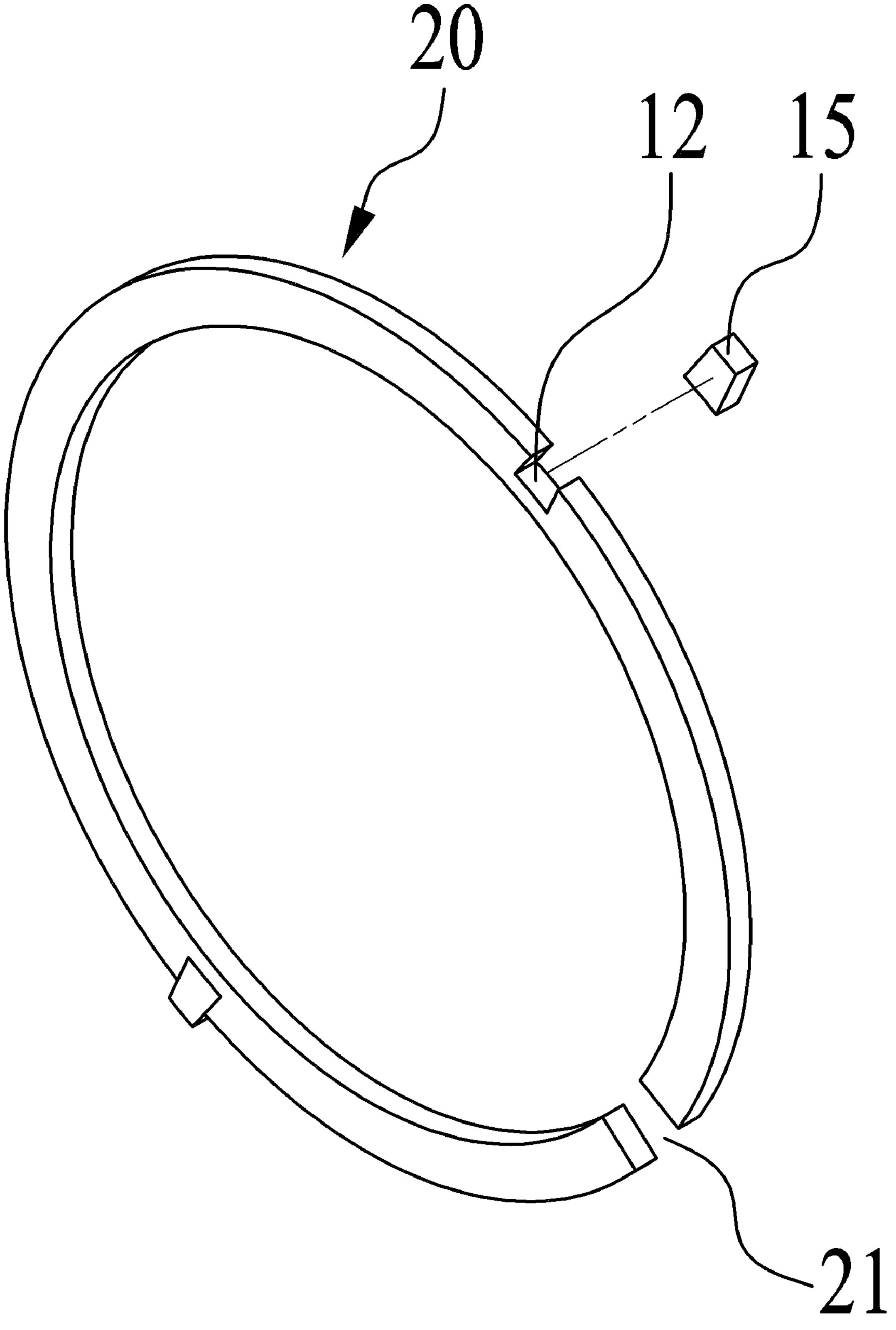

According to the second embodiment of the invention, as illustrated in FIG. 4A and FIG. 4B, the cutting device (100) for rice milling is configured to include the main cutting-device body (11) which is dovetailed with the cutting teeth (15), in which the cutting ring (10) is dovetailed with the cutting teeth (15) at equal intervals along an outer circumferential surface of the main body (11), and the spacer rings (20) are combined alternately between the cutting rings and the cutting rings.

The entire main cutting-device body (11) has a ring shape and has a flat gear shape in which the cutting teeth (15) made of a sintered material are arranged at equal intervals along an outer circumference of the main cutting-device body (11).

The main cutting-device body (11) has a ring shape having a through-hole at a central portion thereof, having multiple fitting grooves (12) at the outer circumference thereof, and having a thickness (t).

An external surface of the main cutting-device body (11) becomes a cutting passage (13), and fitting grooves (12) are formed between the cutting passage (13) and the cutting passage (13). The cutting teeth (15), which will be described below, are fitted into the fitting grooves (12).

The fitting groove (12) has fitting side-surfaces (12*b*) formed at both sides from a fitting bottom (12*a*) and has a structure in which a width between the fitting side-surfaces is narrowed from the fitting bottom (12*a*) toward the external surface of the main cutting-device body (11).

The entire cutting tooth (15) and the entire spacer member (15*b*) which are dovetailed into the fitting grooves have a structure of having a trapezoidal shape which is narrowed in a direction from a bottom (15*a*) of the cutting tooth (15) toward a cutting blade edge (18) of the cutting tooth.

In other words, when the cutting teeth (15) and the spacer members (15*b*), which will be described below, are dovetailed into the fitting grooves (12), selecting this structure enables the cutting teeth (15) and the spacer members (15*b*) not to easily fall out even when the cutting device (100) rotates quickly.

On the other hand, the main cutting-device body (11) does not determine cutting performance, and thus, does not need to maintain a high hardness. Therefore, the main cutting-ring body can be made of general steel and also does not need to be subjected to additional heat treatment.

Next, a structure of the cutting teeth (15) which are dovetailed with the main cutting-ring body (10) will be described. The cutting teeth (15) have a trapezoidal shape having a uniform thickness (t), the thickness is the same thickness (t) at an undersurface and a top surface thereof, and the cutting teeth are made of a hard metal alloy or a ceramic material for a tool.

The bottom (15*a*) of the cutting tooth is dovetailed into the fitting groove (12) of the main cutting-device body (11), and the entire cutting tooth has a structure of having a trapezoidal shape which is narrowed in a direction from the bottom (15*a*) of the cutting tooth toward the cutting blade edge (18).

In other words, when the main cutting-device body (11) is dovetailed with the cutting teeth (15) as described above, selecting the trapezoidal structure of the cutting teeth (15) enables the cutting teeth not to fall out even when the cutting device (100) rotates at a high speed.

On the other hand, the cutting blade edge (18) of the cutting tooth (15) desirably has an angle of larger than 90° and smaller than 104°. When the cutting blade edge has an angle of smaller than 90°, it is difficult to dovetail the cutting teeth (15) with the main cutting-device body (11). When the cutting blade edge (18) has an angle of larger than 104°, shortcomings are as follows. Cutting resistance increases to cause an increase in energy consumption, and a cut surface of a rice grain is rough. A desirable angle of the cutting blade edge is from 95° to (100)°, the cutting teeth (15) can be more strongly fitted into the fitting grooves (12) using an adhesive.

Next, a structure of the space ring (20) which is dovetailed between the cutting tooth (15) and the cutting tooth 15 will be described. The spacer ring (20) has a ring shape having a uniform thickness and has a support shaft inserting hole penetrating the spacer ring at a center.

A cutout portion (21) is an open cutout portion (21) through which an inner circumferential surface and an outer circumferential surface of the spacer ring (20) communicate with each other, and the cutout portion is used as a passage through which air supplied from the outside is discharged when the cutting device (100) is assembled.

On the other hand, in the second embodiment illustrated in FIG. 4B, when one or more fitting grooves (12) are formed in the spacer ring (20) and the cutting teeth (15) are fitted into the fitting grooves, the fitting grooves can function as a guide member which guides movement of rice grains.

What is claimed is:

1. A cutting device (100) of a cutting-type rice milling machine, wherein the cutting device (100) has fitting grooves (12) in a length direction of the main cutting-device body (11) at equal intervals along an outer circumferential surface of the main cutting-device body (11), wherein the fitting grooves (12) are dovetailed with cutting teeth (15) and spacer members (15*b*), wherein the cutting teeth (15) are made of a sintered material, and the spacer members (15*b*) are made of a sintered material or the same material as a material of the main cutting-device body (11), wherein the fitting grooves (12) have a structure in which a width between both fitting side-surfaces (12*b*) is narrowed as both fitting side-surfaces are more extended from a fitting bottom (12*b*), and wherein the cutting teeth (15) have a shape of being narrowed from a bottom (15*a*) of each of the cutting teeth toward a cutting blade edge (18).

2. The cutting device of a cutting-type rice milling machine according to claim 1, wherein the spacer members (15*b*) are each narrowed from the bottom (15*a*) of each of the cutting teeth toward the cutting blade edge (18), and the spacer members (15*b*) are half a height of the cutting teeth (15).

3. The cutting device of a cutting-type rice milling machine according to claim 1, wherein the cutting teeth (15) and the spacer members (15*b*) are alternately fitted into the fitting grooves (12), and are arranged to form a circular shape or a helical shape along the outer circumferential surface of the main cutting-device body (11), respectively.

4. The cutting device of a cutting-type rice milling machine according to claim 1, wherein only the cutting teeth (15) are fitted into one or more fitting grooves (12).

5. The cutting device of a cutting-type rice milling machine according to claim 1, wherein the main cutting-device body (11) has a plurality of through-holes (14) in a cutting passage (13) in a direction toward an inner central portion.

6. A cutting device (100) of a cutting-type rice milling machine, wherein the cutting device (100) includes cutting rings (10) having fitting grooves (12) in a length direction of a main cutting-device body (11) at equal intervals along an outer circumferential surface of the entirely ring-shaped main cutting-device body (11), cutting teeth (15) being fitted into the fitting grooves (12), and spacer rings (20) having a uniform thickness disposed between the cutting rings (10), wherein the fitting grooves (12) have a structure in which a width between both fitting side-surfaces (12*b*) is narrowed as both fitting side-surfaces are more extended from a fitting bottom (12*a*), wherein the cutting teeth (15) have a shape of being narrowed from a bottom (15*a*) of each of the cutting teeth toward a cutting blade edge (18), and wherein the cutting teeth (15) are made of a sintered material.

7. The cutting device of a cutting-type rice milling machine according to claim 6, wherein the cutting teeth (15) are fitted into the fitting grooves (12) using an adhesive.

8. The cutting device of a cutting-type rice milling machine according to claim 6, wherein each of the spacer rings (20) has one or more fitting grooves (12), and the cutting teeth (15) are dovetailed into the fitting grooves (12).

9. The cutting device of a cutting-type rice milling machine according to claim 6, wherein each of the spacer rings (20) have a cutout portion (21).

10. The cutting device of a cutting-type rice milling machine according to claim 2, wherein the main cutting-device body (11) has a plurality of through-holes (14) in a cutting passage (13) in a direction toward an inner central portion.

11. The cutting device of a cutting-type rice milling machine according to claim 3, wherein the main cutting-device body (11) has a plurality of through-holes (14) in a cutting passage (13) in a direction toward an inner central portion.

12. The cutting device of a cutting-type rice milling machine according to claim 4, wherein the main cutting-device body (11) has a plurality of through-holes (14) in a cutting passage (13) in a direction toward an inner central portion.

13. The cutting device of a cutting-type rice milling machine according to claim 7, wherein each of the spacer rings (20) have a cutout portion (21).

14. The cutting device of a cutting-type rice milling machine according to claim 8, wherein each of the spacer rings (20) have a cutout portion (21).

* * * * *